United States Patent
Le et al.

(10) Patent No.: US 7,401,182 B2
(45) Date of Patent: Jul. 15, 2008

(54) METHOD FOR PERSONALIZING THE WORKING OF A PORTABLE COMMUNICATION DEVICE, AND ASSOCIATED PORTABLE COMMUNICATION DEVICE

(75) Inventors: Minh Le, Neuilly sur Seine (FR); Carole Fagnoni, Neuilly sur Seine (FR)

(73) Assignee: T & A Mobile Phones Limited, Hong Kong (CN)

( * ) Notice: Subject to any disclaimer, the term of this patent is extended or adjusted under 35 U.S.C. 154(b) by 232 days.

(21) Appl. No.: 11/439,372

(22) Filed: May 23, 2006

(65) Prior Publication Data
US 2006/0277377 A1  Dec. 7, 2006

(30) Foreign Application Priority Data
May 30, 2005  (EP)  .................. 05300430

(51) Int. Cl.
*H04M 1/00* (2006.01)
(52) U.S. Cl. .................. 711/115; 711/165; 455/557; 455/558; 455/412.1; 455/418; 455/556.1
(58) Field of Classification Search .................. 711/115, 711/165; 455/557, 558, 412.1, 463, 556
See application file for complete search history.

(56) References Cited

U.S. PATENT DOCUMENTS

| | | | | |
|---|---|---|---|---|
| 5,687,216 A | * | 11/1997 | Svensson | 455/412.2 |
| 5,987,325 A | * | 11/1999 | Tayloe | 455/435.2 |
| 6,314,285 B1 | * | 11/2001 | Isberg et al. | 455/418 |
| 6,411,822 B1 | * | 6/2002 | Kraft | 455/558 |
| 6,490,464 B1 | * | 12/2002 | Oda | 455/558 |
| 2002/0045465 A1 | * | 4/2002 | Kishida et al. | 455/566 |
| 2002/0065106 A1 | * | 5/2002 | Bishop et al. | 455/558 |
| 2002/0120852 A1 | * | 8/2002 | Krishnan et al. | 713/185 |
| 2003/0189095 A1 | * | 10/2003 | Tuilier | 235/435 |
| 2004/0116155 A1 | | 6/2004 | Aisenberg | 455/558 |

FOREIGN PATENT DOCUMENTS

| | | | |
|---|---|---|---|
| EP | 1003344 A2 | * | 5/2000 |
| EP | 1075155 A1 | * | 2/2001 |
| JP | 2005107598 | | 4/2005 |
| WO | 0143408 | | 6/2001 |

* cited by examiner

*Primary Examiner*—Jack A Lane
(74) *Attorney, Agent, or Firm*—Morgan, Lewis & Bockius LLP

(57) ABSTRACT

A method for personalizing the working of a portable communication device (1) including the steps of an initialization step ($A_0$) during which multimedia content data files are stored ($A_{01}$) in a removable memory (18) of said portable communication device, and personalization parameters for controlling peripherals (2, 17) of said device are set ($A_{02}$) with software links to at least some of said data files; and further including prior to removal of said removable memory (18), a step ($A_{03}$) for creating a table including said software links, and a step ($A_2$) for copying, according to said table, said data files for which software links exist or at least a transformation of said data files, from said removable memory (18) to an internal memory (7) of said portable communication device.

9 Claims, 2 Drawing Sheets

METHOD FOR PERSONALIZING THE WORKING OF A PORTABLE COMMUNICATION DEVICE, AND ASSOCIATED PORTABLE COMMUNICATION DEVICE

RELATED APPLICATION

This application is related to and claims the benefit of priority from European Patent Application No. 05 300 430.5, filed on May 30, 2005, the entirety of which is incorporated herein by reference.

FIELD OF THE INVENTION

The present invention concerns a method for personalizing the working of a portable communication device of the type comprising an internal memory and at least a removable memory.

BACKGROUND

It is already known for portable communication devices, such as mobile phones or personal digital assistants, to provide the device with means enabling a user to give a personal touch to his device. For instance in the case of a mobile phone, a user can choose the ringing tone between several tones or melodies which have been pre stored in the mobile phone, eventually in association with the identity of the calling party in case this party has been stored in the phone directory of the mobile phone. More recently, it has also been proposed to display an image in association with the identity of the caller, such as but not limited to a photography of this caller. Other possibilities of mobile phone's personalization do exist, such as the choice of the image which can be displayed as screen saver, or the way for alerting a user of different events (incoming SMS, incoming E-mail, timer functionalities . . . ).

In view of this personalization, more and more data with multimedia content (music, image and video) have to be stored in a memory of the device in order to be linked to a particular event according to the user's choice.

However, the internal memory of a portable communication device is generally not large enough to store a great amount of data with multimedia content.

Some devices have already been proposed including both an internal memory and a removable memory of greater size for enabling the storage of a greater amount of data. However, problem exists when this external memory is used for storage of data for personalization purpose because the device cannot perform the personalized actions in case the removable memory is actually removed.

OBJECTS AND SUMMARY

The aim of the invention is to remedy the above drawback and limitation by providing a way to keep personalization whatever the objects used for personalization are stored on internal or external memory, and even in case external memory is removed. To this aim, an object of the present invention is a method for personalizing the working of a portable communication device, characterized in that it comprises the following steps:

An initialization step during which multimedia content data files are stored in a removable memory of said portable communication device, and personalization parameters for controlling peripherals of said device are set with software links to at least some of said data files;

Prior to removal of said removable memory, a step for creating a table including said software links, and a step for copying, according to said table, said data files for which software links exist, or at least a transformation of said data files, from said removable memory to an internal memory of said portable communication device.

Another object of the invention is a portable communication device for implementing a method according to anyone of the preceding claims, characterized in that it comprises:
  A removable memory for storage of said data files;
  An internal memory for storage of said table including said software links;
  Means for detecting the removal of said removable memory; and
  Means for copying, according to said table, said data files for which software Links exist, or at least a transformation of said data files, from said removable memory to said internal memory.

BRIEF DESCRIPTION OF THE DRAWINGS

The advantages of the invention will become apparent from the following description made with reference to the accompanying drawings, in which.

DETAILED DESCRIPTION

Figure 1:
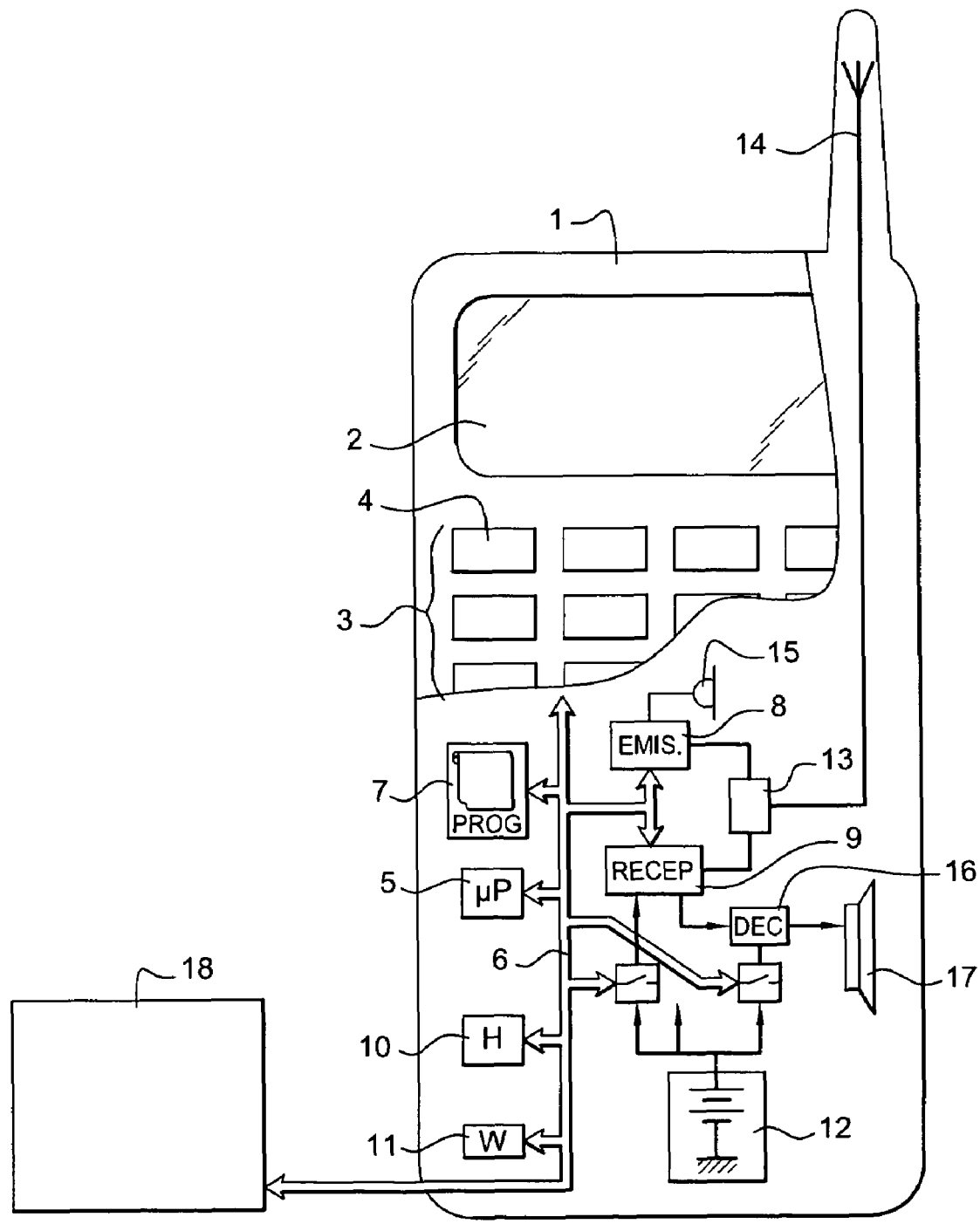
FIG. 1 shows an example of mobile telephone provided with means for implementing the method of the invention.

FIG. 1 shows a mobile telephone 1 which can be used to implement the method of the invention. In the manner that is well-known in the art, it essentially includes, in a casing, a screen 2 and a keypad 3 with keys 4 for operating the mobile telephone as required. From the functional point of view, the mobile telephone includes an electronic circuit including a microprocessor 5 connected by a data, address and control bus 6 to screen 2 and keypad 3, an internal memory 7 for storing data and programs to be executed, transmit circuits 8 and receive circuits 9. From the practical point of view, bus 6 is also connected to a clock 10 and to a scratchpad 11, for example a static or dynamic memory. A battery 12 supplies electrical power to the various circuits. When transmitting or receiving, circuits 8 and 9 are connected, for instance via a duplexer 13, to a transmit-receiver antenna 14. The transmit circuits receive the signals to be transmitted from a microphone 15. The receive circuits are connected to a receive decoder 16 connected to a loudspeaker 17. The microphone 15 and the loudspeaker 17 are shown symbolically here. The mobile telephone can be used for classical voices communications, but also to send faxes, or even data if it is connected to a microcomputer via an interface, not shown, between the mobile telephone and the microcomputer. The microprocessor 5 also controls this interface via the bus 6. The above description is merely one example of the functional architecture of a mobile telephone.

Among the different programs stored in internal memory 7, dedicated programs exist which, when executed under the control of microprocessor 5, enable the control of peripherals (display, loudspeaker . . . ) to perform some particular actions (like displaying of a given image or video, or playing of a particular melody). Data with multimedia contents (images or videos and/or music) used for these particular actions must be first stored in a memory which can be read when needed by the dedicated programs. According to the invention, in order to offer to the user a large possibility of storage, an additional removable memory 18 is provided. In FIG. 1, this memory has been shown as an element external from housing. However, this memory can also be a removable card inserted in a suitable slot of the mobile phone, such as a SIM card, or any suitable memory card, or a removable hard disk.

Different steps of the method according to a preferred embodiment of the invention will now be described in reference with FIG. 2.

During an initialization step $A_0$, a first sub step $A_{01}$ consists in storing multimedia content data files in the removable memory 18. This can be done via the mobile phone, for instance by downloading said data files from provider's websites or communication network, or by linking said mobile phone equipped with said internal memory to a PC via any existing known wired or wireless link. The wording "multimedia content" relates to audio files, and/or video, and/or images. Then, in sub step $A_{02}$, personalization parameters for controlling peripherals like display 2 and/or loudspeaker 17, are set, and associated software links to at least some of said data files are created. This is performed for instance via a specific menu by which a user will select, by way of example, which melody must be played by loudspeaker 17 when receiving an incoming call, eventually depending on caller's identity, and/or which image must be displayed on display 2 when a particular event occurs. The user's choices are transformed inside the software of the mobile phone into software links which correspond to the addresses at which the different programs controlling peripherals such as display 2 or loudspeaker 17 will find the associated data files inside removable memory 18.

Then, at any time, but at least prior to removal of said removable memory 18, a step $A_{03}$ is performed for creating a table including said software links.

In order that personalization parameters still work even in case of removal of memory 18, the method according to the invention preferably comprises a step $A_1$ for detecting automatically that said removable memory is going to be removed. This can be done by providing the portable device with a dedicated key (not shown) which can be activated by a user for ejecting said removable memory. Alternatively, in case removable memory 18 is inserted inside housing 1, either in a dedicated trap, or in a slot, mechanical means such as a trapdoor can be provided in said device in order to mechanically detect that memory 18 is going to be ejected. Detection of memory's removal at step $A_1$ controls performing of a step $A_2$ for copying data files for which software links exist (or at least a transformation of said data files as will be explained hereinafter), from said removable memory 18 to internal memory 7 of the portable communication device. Step $A_2$ is performed either automatically, or eventually after a user's confirmation. New links to new location of data files inside internal memory 7 can then be created in step $A_3$.

Since internal memory 7 is normally of smaller size than removable memory 18, it might be not possible to copy all data files stored in memory 18 into internal memory 7. Consequently, a priority order is preferably associated to each software link of table created at step $A_{03}$. In this case, step $A_2$ consists in copying said data files or at least a transformation of said data files according to the priority order.

Another way to accommodate with the different sizse between memory 18 and memory 7 is to copy, at step A2, not directly the data files, but at least a transformation of said data files. The purpose of this transformation is to reduce the size of the copied data to the necessary. By way of example, in case concerned data file is a music file associated for instance to a ringing tone of an incoming call, it is not necessary to keep the whole file and the transformation might consist in shortening the length of the music file (for instance just keeping the first 20 seconds of the file, possibly with a low bitrate). In case said data file is an image, said transformation might consist in miniaturizing said image in order to reduce the size of the file before copy. More generally, transformation can be all types of filtering which reduce the total size of the data before copy.

Alternative embodiments of the method described above can be done:

For instance, instead of checking in step $A_1$ that removable memory 18 is going to be removed, it is possible to trigger step $A_2$ for copying data or transformed data on the user's request.

Figure 2:
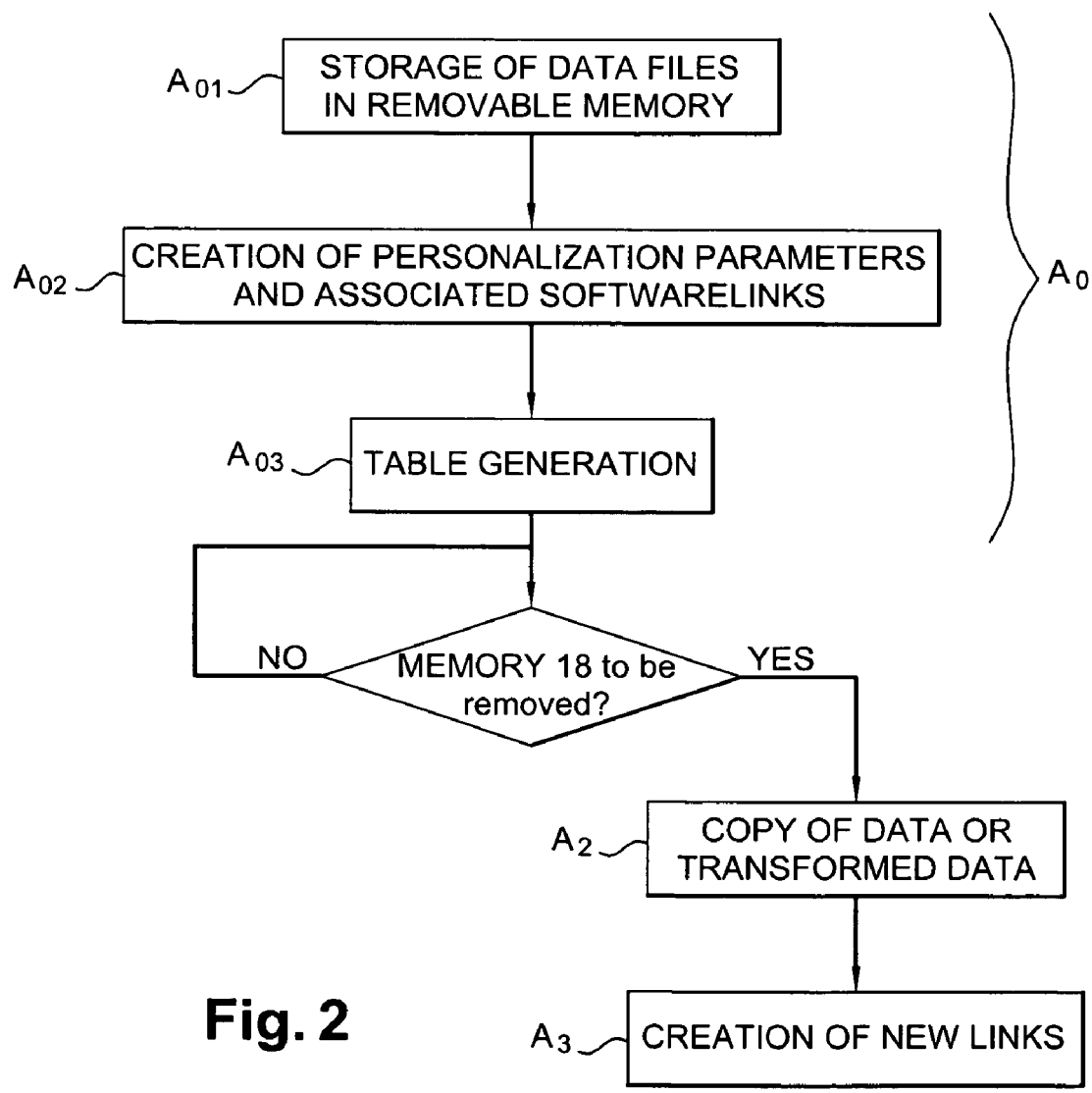
FIG. 2 is a flowchart of the steps of the method according to a preferred embodiment of the invention.

Moreover, although step $A_{03}$ for generating table including software links has been shown on FIG. 2 as a part of initialization step $A_0$, step $A_{03}$ could alternatively be done just before step $A_2$ for copying data or transformed data, either on user's request, or upon detection that memory 18 is going to be removed.

The invention claimed is:

1. Method for personalizing the working of a portable communication device comprising the steps of:
   An initialization step during which multimedia content data files are stored in a removable memory of said portable communication device, and personalization parameters for controlling peripherals of said device are set with software links to at least some of said data files;
   Prior to removal of said removable memory, a step for creating a table including said software links, and a step for copying, according to said table, said data files for which software links exist, or at least a transformation of said data files, from said removable memory to an internal memory of said portable communication device.

2. Method according to claim 1, wherein said step for copying is performed on the user's request.

3. Method according to claim 1, further comprising a step for detecting automatically that said removable memory is going to be removed, and controlling performing of said step for copying.

4. Method according to claim 1, wherein a priority order is associated to each software link of said table, and in that the step of copying includes copying said data files or at least a transformation of said data files according to the priority order.

5. Method according to claim 1, wherein said data files includes at least a music file, and in that said transformation includes shortening the length of said music file.

6. Method according to claim 1, wherein said data files includes at least an image, and in that said transformation includes miniaturizing said image in order to reduce the size of the file before copy.

7. Portable communication device for implementing a method according to claim 1, comprising:
   A removable memory for storage of said data files;
   An internal memory for storage of said table including said software links;
   Means for detecting the removal of said removable memory; and
   Means for copying, according to said table, said data files for which software links exist, or at least a transformation of said data files, from said removable memory to said internal memory.

8. Portable communication device according to claim 7, characterized in that said means for detecting removal of said removable memory consist in a dedicated key which can be activated by a user for ejecting said removable memory.

9. Portable communication device according to claim 7, wherein said device is a mobile phone and said peripherals comprise a display and a loudspeaker of said mobile phone.

* * * * *